US012088053B2

(12) United States Patent
Kim et al.

(10) Patent No.: US 12,088,053 B2
(45) Date of Patent: Sep. 10, 2024

(54) CABLE ADAPTOR COAXIALLY CONNECTED TO AN OUTER CONDUCTOR AND SIGNAL LINE OF A CABLE

(71) Applicants: SENSORVIEW CO., LTD., Gyeonggi-do (KR); okins electronics Co., Ltd, Gyeonggi-do (KR); Hyun Duk Kim, Gyeonggi-do (KR)

(72) Inventors: Byoung Nam Kim, Gyeonggi-do (KR); Kyoung Il Kang, Gyeonggi-do (KR); Jin Woo Lee, Chungcheongnam-do (KR); Jin Kook Jun, Gyeonggi-do (KR); Sung Gyu Park, Gyeonggi-do (KR); Hyun Duk Kim, Gyeonggi-do (KR); Jong Wook Ham, Gyeonggi-do (KR); Sang Woo Han, Gyeonggi-do (KR)

(73) Assignees: SENSORVIEW CO. LTD., Gyeonggi-do (KR); OKINS ELECTRONICS., LTD, Gyeonggi-do (KR); Hyun Duk Kim, Gyeonggi-do (KR)

( * ) Notice: Subject to any disclaimer, the term of this patent is extended or adjusted under 35 U.S.C. 154(b) by 337 days.

(21) Appl. No.: 17/719,506

(22) Filed: Apr. 13, 2022

(65) Prior Publication Data

US 2022/0336973 A1 Oct. 20, 2022

(30) Foreign Application Priority Data

Apr. 19, 2021 (KR) ........................ 10-2021-0050623

(51) Int. Cl.

| | |
|---|---|
| ***H01R 9/05*** | (2006.01) |
| ***H01R 13/17*** | (2006.01) |
| ***H01R 13/502*** | (2006.01) |

(52) U.S. Cl.

CPC ............... *H01R 9/05* (2013.01); *H01R 13/17* (2013.01); *H01R 13/502* (2013.01)

(58) Field of Classification Search

CPC ........ H01R 9/05; H01R 13/17; H01R 13/502; H01R 13/2428; H01R 24/44; H01R 24/542; H01R 13/111

See application file for complete search history.

(56) References Cited

U.S. PATENT DOCUMENTS 4,867,707 A * 9/1989 Widdoes ............ H01R 13/6585 439/675
5,441,424 A * 8/1995 Morlion ............ H01R 13/6592 439/578

(Continued)

FOREIGN PATENT DOCUMENTS

CN 102239602 A 11/2011
JP 2009-052913 A 3/2009

(Continued)

OTHER PUBLICATIONS

Office Action from corresponding Taiwan Patent Application No. 11220436750, dated May 4, 2023.

(Continued)

*Primary Examiner* — Travis S Chambers

(57) ABSTRACT

Disclosed is a cable adaptor comprising a first member which is conductive and comes into contact with a signal pin of the cable, a second member disposed outside the first member and coupled to the first member, a third member which is conductive and disposed outside the second member, and a contact pin fixed to the first member. Here, the first member includes a first body coupled to the second member and a first contact portion which extends from the first body and comes into contact with the signal pin. The third member includes a second body coupled to the second member and a second contact portion which extends from (Continued)

the second body and comes into contact with the outer conductor. A plurality of first contact points of the signal pin and the first contact portion are arranged at same intervals along a circumferential direction of the signal pin.

13 Claims, 16 Drawing Sheets

(56) References Cited

U.S. PATENT DOCUMENTS

| | | | | |
|---|---|---|---|---|
| 6,808,416 | B2 * | 10/2004 | Fegley | H01R 9/0518 439/585 |
| 8,702,456 | B1 | 4/2014 | Wang | |
| 2017/0052217 | A1 | 2/2017 | Zhang | |

FOREIGN PATENT DOCUMENTS

| | | | |
|---|---|---|---|
| KR | 2000-0011531 | A | 2/2000 |
| KR | 10-2011-0082560 | A | 7/2011 |
| KR | 10-2017-0029686 | A | 3/2017 |
| TW | M411705 | U | 9/2011 |

OTHER PUBLICATIONS

Office Action from corresponding Korean Patent Application No. 10-2021-0050623, dated Jul. 1, 2022.

* cited by examiner

CABLE ADAPTOR COAXIALLY CONNECTED TO AN OUTER CONDUCTOR AND SIGNAL LINE OF A CABLE

CROSS-REFERENCE TO RELATED APPLICATION

This application claims the benefit of Korean Patent Application No. 10-2021-0050623, filed on Apr. 19, 2021, in the Korean Intellectual Property Office, the disclosure of which is incorporated herein in its entirety by reference.

FIELD

Embodiments relate to a cable adaptor, and more particularly, to an adaptor for electrically connecting a cable to an object being tested while maintaining a common axis with the cable.

BACKGROUND

For equipment performance evaluation, an adaptor which comes into electrical contact with equipment is connected to a cable. The adaptor needs not only to mechanically and electrically connect a signal pin of the cable but also to satisfy impedance matching conditions with an object being tested.

Meanwhile, the cable may include a separate outer conductor for grounding or shielding. Also, an adaptor for grounding includes a structure for contact with the outer conductor. In the structure of the adaptor, a grounding structure of the adaptor may be implemented in a clip form which comes into elastic contact with the outer conductor of the cable.

However, since the adaptor having the above structure has the clip-form grounding structure which pressurizes the cable in a direction with respect to the outer conductor, there is a problem that the adaptor has a difficulty in being coaxially connected to the outer conductor of the cable. When the outer conductor of the cable is not coaxially connected to the adaptor, there is a serious difficulty in impedance matching with the object being tested.

Also, generally, the adaptor installed on the signal pin of the cable comes into electrical contact with the signal pin in only one direction, and thus the signal pin of the cable and the adaptor are not coaxially connected. Accordingly, there is a serious difficulty in impedance matching between the adaptor and the signal pin of the cable.

RELATED ART DOCUMENT

Patent Document

Patent Document 0001: Korean Patent Publication No. 2000-0011531

SUMMARY OF THE INVENTION

The present invention is directed to providing a cable adaptor which is capable of being coaxially connected to an outer conductor and a signal line of a cable.

Aspects of the present invention are not limited to the above-stated aspect and other unstated aspects of the present invention will be understood by those skilled in the art from the following disclosure.

According to an aspect of the present invention, there is provided a cable adaptor which is connected to a cable including an outer conductor. The adaptor includes a first member which is conductive and comes into contact with a signal pin of the cable, a second member disposed outside the first member and coupled to the first member, a third member which is conductive and disposed outside the second member, and a contact pin fixed to the first member. Here, the first member includes a first body coupled to the second member and a first contact portion which extends from the first body and comes into contact with the signal pin. The third member includes a second body coupled to the second member and a second contact portion which extends from the second body and comes into contact with the outer conductor. A plurality of first contact points of the signal pin and the first contact portion are arranged at same intervals along a circumferential direction of the signal pin. Also, a plurality of second contact points of the outer conductor and the second contact portion are arranged at same intervals along a circumferential direction of the outer conductor.

The plurality of first contact points may be arranged at same positions in a longitudinal direction of the signal pin, and the plurality of second contact points may be arranged at same positions in a longitudinal direction of the outer conductor.

The first contact portion may include a first ring-shaped frame and a plurality of first legs which extend from the first ring-shaped frame and are connected to the first body. The plurality of first legs may be bent and may come into elastic contact with the signal pin at the first contact points. The second contact portion may include a second ring-shaped frame and a plurality of second legs which extend from the second ring-shaped frame and are connected to the second body. Also, the plurality of second legs may be bent and may come into elastic contact with the outer conductor at the second contact points.

The second body may include a plurality of spiral elastic pieces which extend from a lower surface of the second body and are disposed to be spaced apart from the lower surface of the second body.

The second member may include a slot portion concavely formed in an outer surface of the second member along a longitudinal direction of the second member. Also, the third member may include a protrusion which protrudes from an inner surface of the third member and is disposed in the slot portion.

The slot portion may include a first slot and a second slot. Here, the first slot and the second slot may be alternately arranged along a circumferential direction of the second member. Also, an inlet of the first slot may be opposite to an inlet of the second slot on the basis of a longitudinal direction.

According to another aspect of the present invention, there is provided a cable adaptor which is connected to a cable including an outer conductor. The adaptor includes a first member which is conductive and comes into contact with a signal pin of the cable, a second member disposed outside the first member and coupled to the first member, a third member which is conductive and disposed outside the second member, and a contact pin fixed to the first member. Here, the first member comes into contact with the signal pin and forms a plurality of first contact points. The third member comes into contact with the outer conductor and forms a plurality of second contact points. The plurality of first contact points are arranged on a first circumference on the basis of a center of the cable. Also, the plurality of second contact points are arranged on a second circumference on the basis of the center of the cable.

The contact pin may be a pogo pin having a restoring force at the time of contracting.

The contact pin may be a coil spring having a restoring force at the time of contracting.

The contact pin may include a first area and a second area having a pitch greater than a pitch of the first area, and an outer diameter of the second area may be smaller than an outer diameter of the first area.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

The purpose, particular advantages, and novel features will be more clarified from the following detailed description related to the attached drawings and exemplary embodiments. Also, the terms or words used in the specification and the claims should not be limited to general or lexical meanings and should be construed as meanings and concepts coinciding with the technical concept of the present invention on the basis of a principle that the inventor can appropriately define the concepts of the terms to explain the invention in the best way. Also, in description of the present invention, detailed description of well-known arts related to the present invention will be omitted when it is deemed to unnecessarily obscure the essentials of the present invention.

Also, in describing components of the embodiment of the present invention, terms such as "first," "second," "A," "B," and the like may be used. These terms are merely for distinguishing one element from another, and the essential, order, sequence, and the like of corresponding elements are not limited by the terms.

Figure 1:
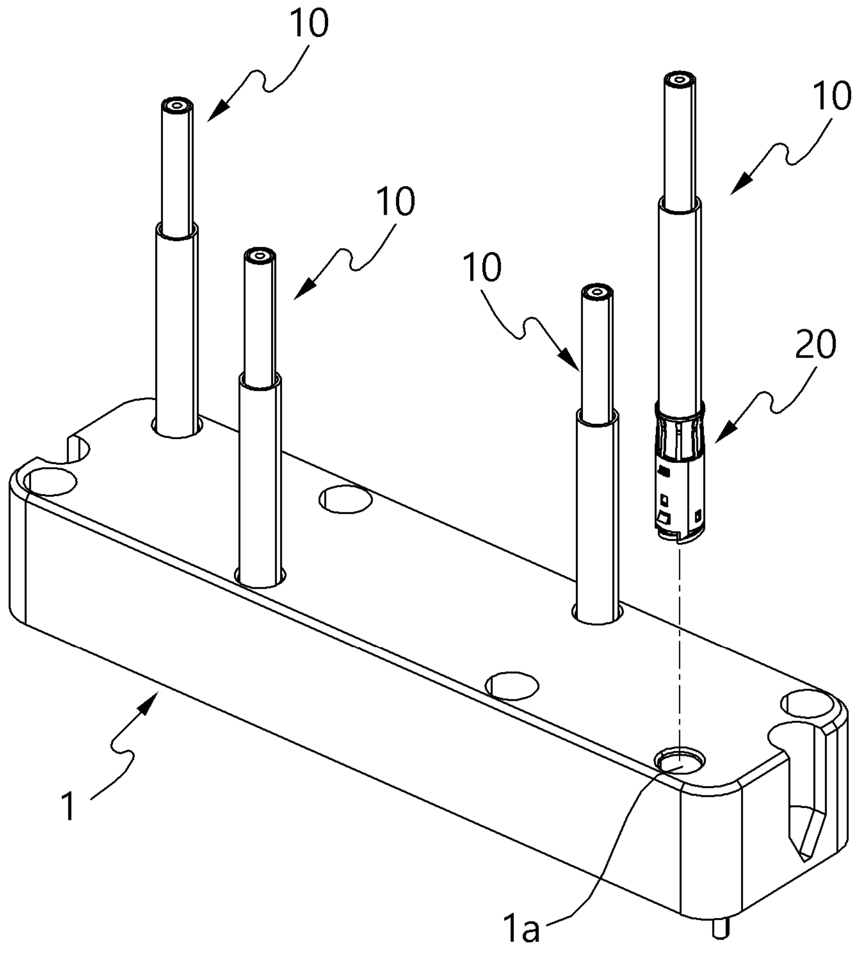
FIG. 1 is a perspective view illustrating an assembly in which adaptors to which assembly cables are fastened are arranged.

FIG. 1 is a perspective view illustrating an assembly in which adaptors 20 to which cables are fastened are arranged.

Hereinafter, in describing the embodiment, a "longitudinal" direction is shown as a z-axis in the drawings, which refers to a direction in which the cable and the adaptor are coupled, and a direction perpendicular to the z-axis is shown as a y-axis in the drawings. Hereinafter, a circumferential direction is based on a center of the cable.

A plurality of such adaptors 20 may be arranged at certain intervals on a base 1. In FIG. 1, only some of the plurality of adaptors 20 arranged on the base 1 may be shown. The base 1 may include a plurality of holes 1*a* passing through an upper surface and a lower surface. The adaptors 20 may be inserted into the holes 1*a*, respectively. An assembly cable 10 is connected to the adaptor 20. The adaptor 20 comes into contact with an object being tested. The adaptor 20 electrically connects the assembly cable 10 to the object being tested. The object being tested may be an electronic device such as a semiconductor chip.

In one or more embodiments, in an assembly sequence, the adaptor 20 may be mounted on the base 1 and then the cable 10 may be fastened to the adaptor 20. Here, the adaptor 20 may be inserted into the base 1 from top to bottom in a z-axis direction to be assembled or may be inserted into the base 1 from bottom to top to be assembled. While the adaptor 20 is assembled with the base 1, the cable 10 may be inserted into the adaptor 20 from top to bottom in the z-axis direction to be assembled.

Since the assembly cable 10 shown in the drawing is merely an example of assembly cables which the adaptor 20 of the present invention can accommodate, the present invention is not limited to a configuration of the cable 10 and the adaptor 20 of the present invention may accommodate a variety of types of assembly cables.

In one or more embodiments, a tubular outer conductor 12 may be exposed outside the assembly cable 10. The outer conductor 12 may be a metal member which functions as a shield. Here, the cable 10 may be a coaxial cable. The cable 10 may include a signal line 13 in the innermost part, a dielectric 14 which surrounds the signal line 13, a conductor 15 which surrounds the dielectric 14, and an outer cover 16 which surrounds the conductor 15. The signal line 13 may be exposed externally from one end of the cable 10, and the externally exposed signal line 13 may be inserted into a signal pin 11.

The conductor 15 and the outer cover 16 are partially removed from the cable 10 so that the dielectric may be exposed. Here, a cylindrical connecting conductor 17 which surrounds the exposed dielectric 14 may be included. One end of the conductor 15 of the cable 10 may come into contact with the connecting conductor 17 to be electrically connected to the outer conductor 12 which surrounds the connecting conductor 17. Also, in a longitudinal direction, an annular insulator 18 which prevents contact between the signal line 11 and the connecting conductor 17 may be provided between the signal pin 11 and the connecting conductor 17. An insulator block 19 which supports the signal pin 11 against the outer conductor 12 may be installed on an outer circumference of the signal pin 11.

Figure 2:
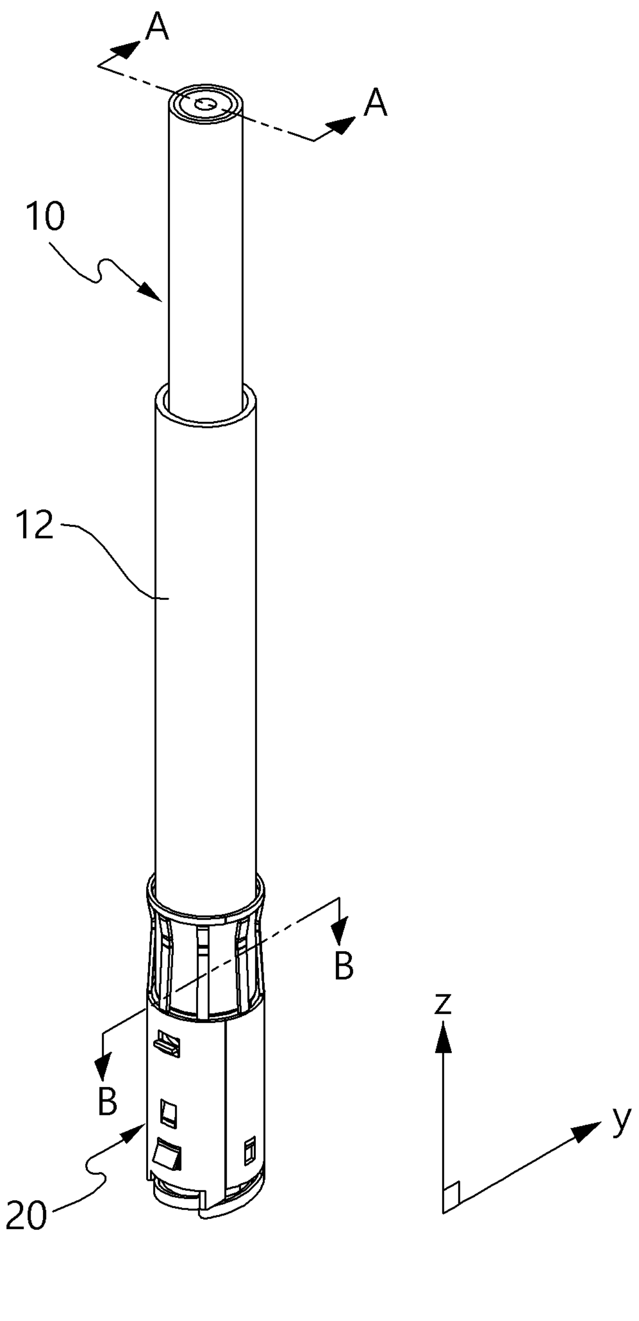
FIG. 2 is a perspective view illustrating the adaptor to which the assembly cable is fastened.
Figure 3:
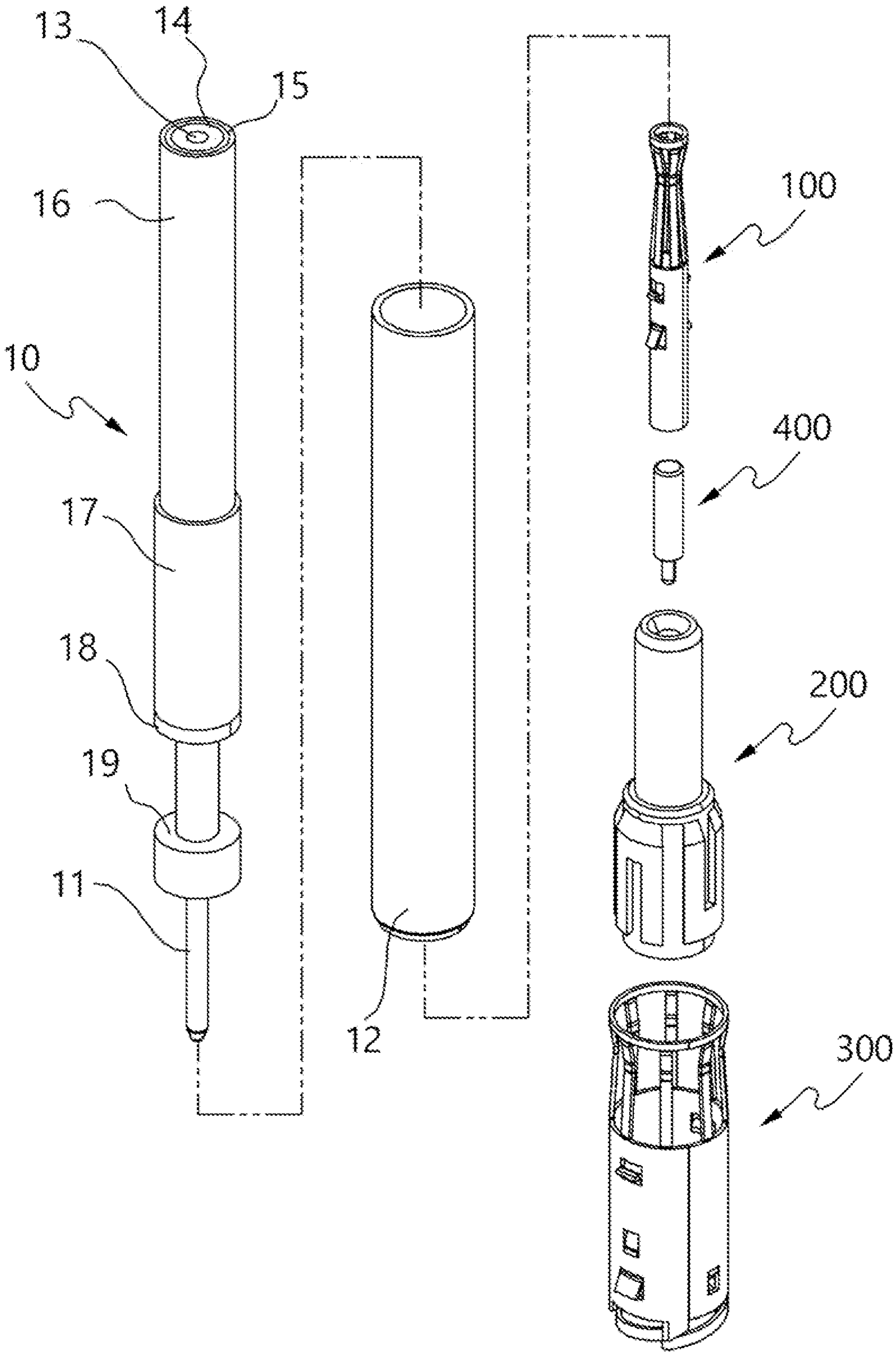
FIG. 3 is an exploded view illustrating the adaptor shown in FIG. 2.

FIG. 2 is a perspective view illustrating the adaptor 20 to which the assembly cable 10 is fastened, and FIG. 3 is an exploded view illustrating the adaptor 20 shown in FIG. 2.

Referring to FIG. 3, the adaptor 20 may include a first member 100, a second member 200, a third member 300, and a contact pin 400.

The first member 100 comes into electrical contact with the signal pin 11 of the cable 10. The signal pin 11 of the cable 10 may be disposed inside the first member 100. The contact pin 400 may be disposed inside the first member 100. The first member 100 is formed of a conducting material and electrically connects the signal pin 11 to the contact pin 400.

In the embodiment of the present invention, the contact pin 400 is electrically connected, with the first member 100, to the signal pin 11 and the signal line 13 of the cable 10 and functions as a pin which transmits a signal but is not limited thereto and may function as a ground pin or power pin when connected to a ground or electrically connected to a power line which transmits a voltage and current.

The first member 100 may be coupled to an inside of the second member 200.

The second member 200 is disposed outside the first member 100. Part of the second member 200 may be disposed inside the outer conductor 12.

The third member 300 comes into electrical contact with the outer conductor 12 of the cable 10. The third member 300 is disposed outside the second member 200. The third member 300 is coupled to the second member 200. Also, the third member 300 is a conducting material.

The contact pin 400 is fixed to the first member 100. The contact pin 400 may be disposed inside the first member 100. The contact pin 400 comes into electrical contact with the object being tested. The contact pin 400 may have a restoring force at the time of contracting. For example, the contact pin 400 may be a pogo pin.

Figure 4:
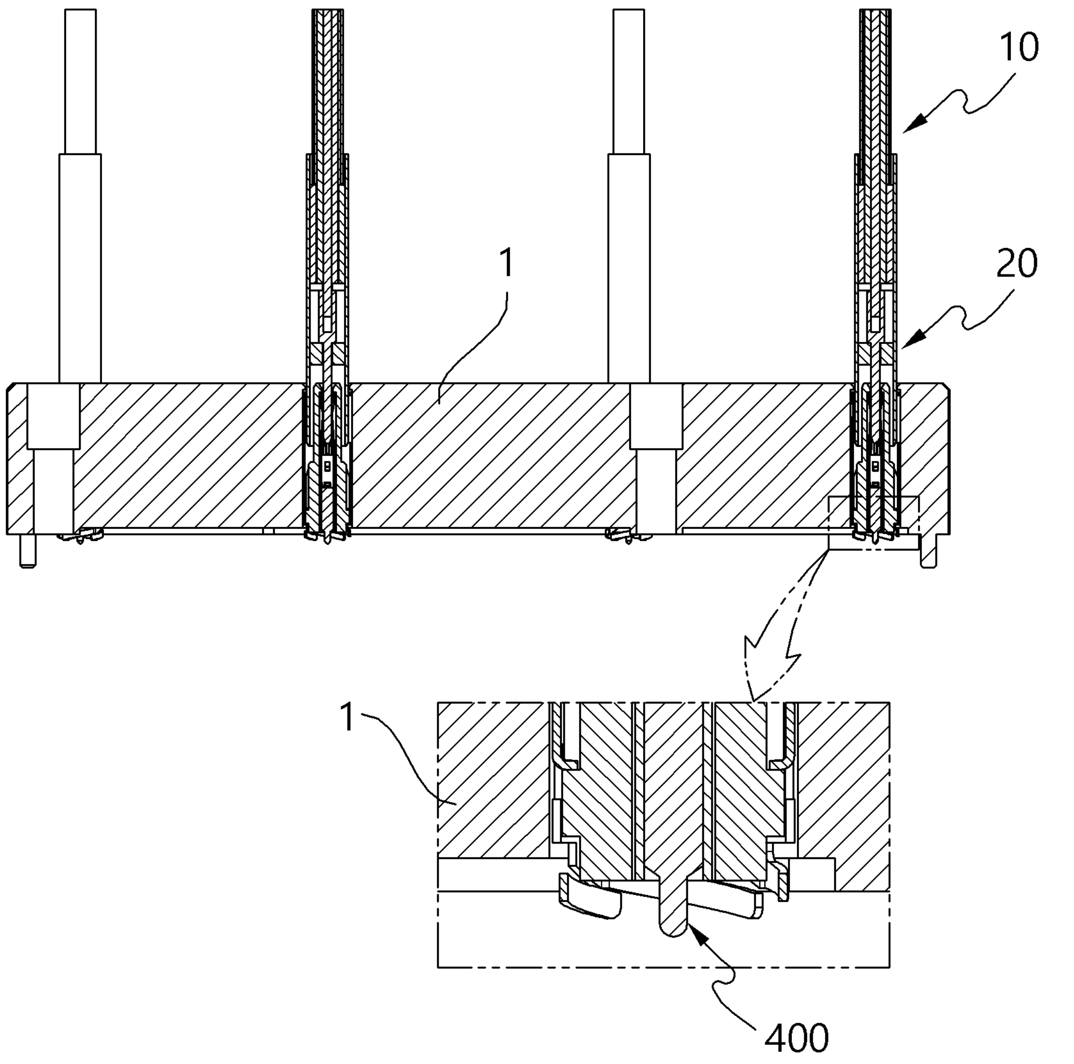
FIG. 4 is a side cross-sectional view of the assembly shown in FIG. 1 in which the adaptors are arranged.

FIG. 4 is a side cross-sectional view of the assembly shown in FIG. 1 in which the adaptors 20 are arranged.

Referring to FIG. 4, an end of the adaptor 20 may protrude from the lower surface of the base 1 and come into contact with the object being tested. The contact pin 400 may protrude from the end of the adaptor 20 and come into contact with the object being tested.

Figure 5:
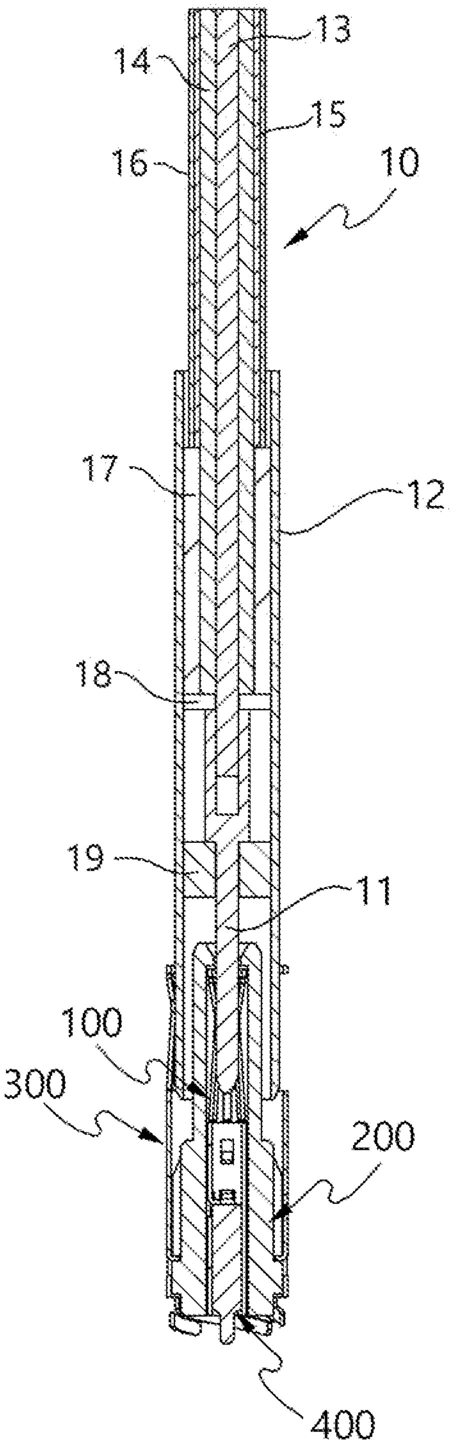
FIG. 5 is a side cross-sectional view of the adaptor on the basis of line A-A of FIG. 2.
Figure 6:
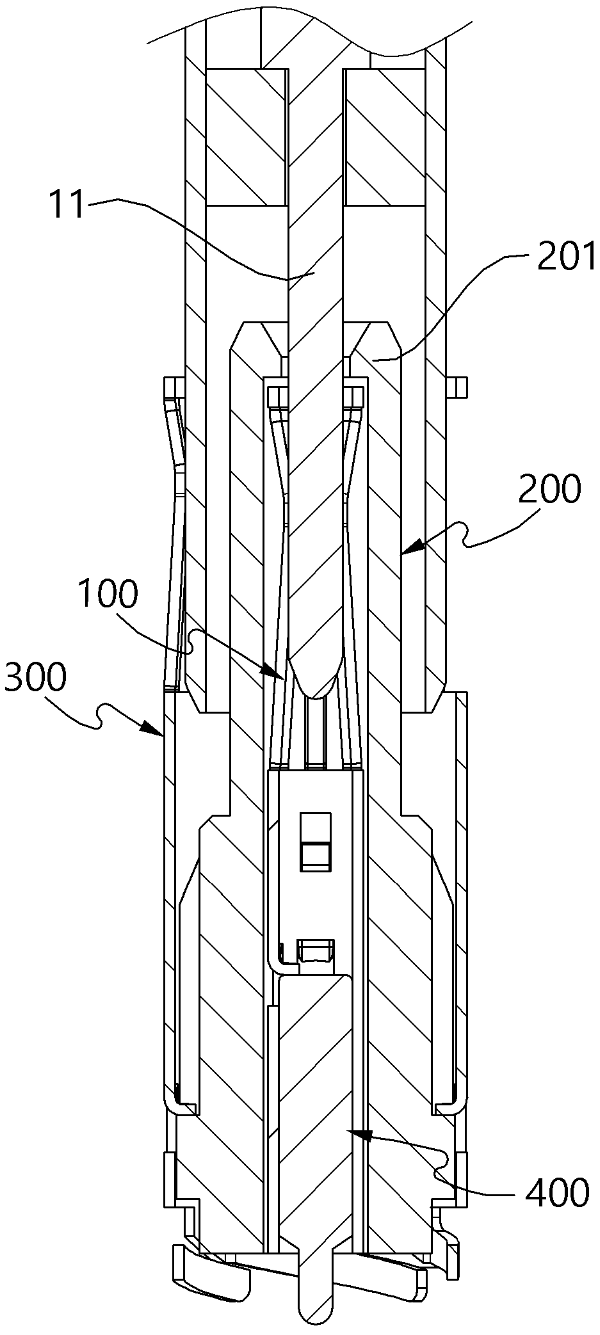
FIG. 6 is a side cross-sectional view of the adaptor.

FIG. 5 is a side cross-sectional view of the adaptor 20 on the basis of line A-A of FIG. 2, and FIG. 6 is a side cross-sectional view illustrating a lower side of the adaptor 20.

Referring to FIGS. 5 and 6, the signal pin 11 of the cable 10 is disposed on an upper side inside the first member 100, and the contact pin 400 is disposed on a lower side inside the first member 100. The second member 200 is formed as a hollow member, and thus the first member 100 is located thereinside. Since a stepped structure 201 is disposed on an upper end of the second member 200, there is an advantage that the first member 100 is caught by the stepped structure 201 and not pushed back when the contact pin 400 is pushed. The third member 300 is coupled to an outside the second member 200.

Figure 7:
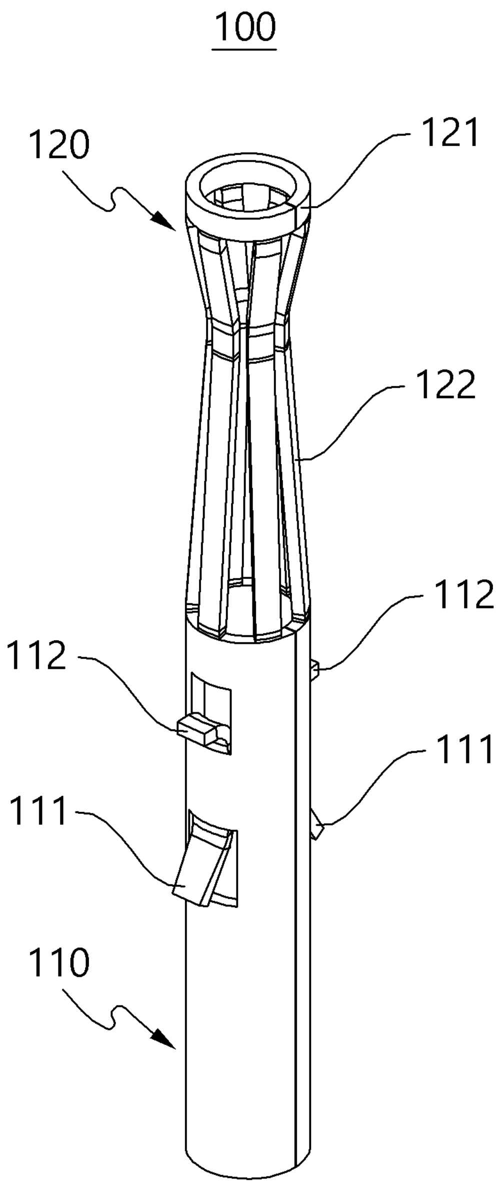
FIG. 7 is a perspective view illustrating a first member.

FIG. 7 is a perspective view illustrating the first member 100.

Referring to FIG. 7, the first member 100 may include a first body 110 and a first contact portion 120.

The first body 110 is a cylindrical member and coupled to the second member 200. The first body 110 may include a first protrusion 111 and a second protrusion 112. The first protrusion 111 and the second protrusion 112 are sections formed by cutting parts of the first body 110 and may be bent and protrude outward. The first protrusion 111 may be bent downward toward outside of the first body 110. The second protrusion 112 may be bent upward toward outside of the first body 110.

The first protrusion 111 and the second protrusion 112 may come into elastic contact with an inner circumferential surface of the second member 200 and increase a coupling property of the first member 100 to the second member 200. The first protrusion 111 and the second protrusion 112 are symmetrically arranged on the basis of a center of the first body 110 so as to facilitate coaxial coupling of the first member 100 and the second member 200 to the cable 10.

The first contact portion 120 is a part which comes into contact with the signal pin 11 of the cable 10. The first contact portion 120 is disposed to extend upward from the first body 110. The first contact portion 120 may include a first ring-shaped frame 121 and a plurality of first legs 122. The first ring-shaped frame 121 may be disposed to be spaced apart from the first body 110 in a longitudinal direction (z-axis), and the plurality of first legs 122 may extend from the first ring-shaped frame 121 and may be connected to an upper surface of the first body 110. The first legs 122 may be arranged at certain intervals along a circumferential direction of the first ring-shaped frame 121.

The first legs 122 may have a bent shape to be partially located more inward than the first ring-shaped frame 121. For example, the plurality of first legs 122 may have a shape in which an intermediate area is formed to be concave in the longitudinal direction (z-axis). The first legs 122 may include an elastically deformable material. The plurality of first legs 122 may have the same size and shape.

The signal pin 11 of the cable 10 passes through the first ring-shaped frame 121 and is inserted into the first contact portion 120 along the first legs 122.

Figure 8:
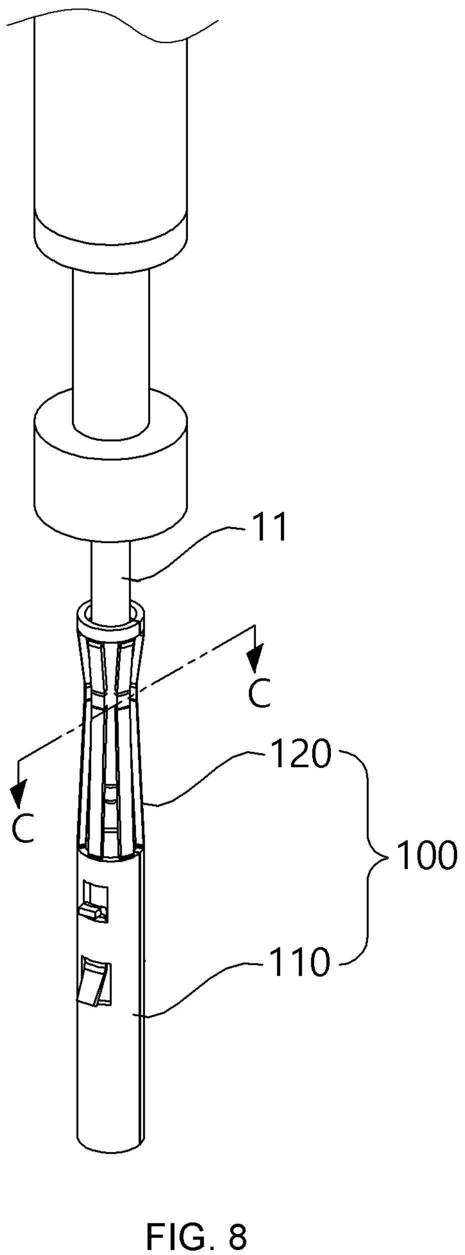
FIG. 8 is a view illustrating the first member in which a signal pin of a cable is inserted.
Figure 9:
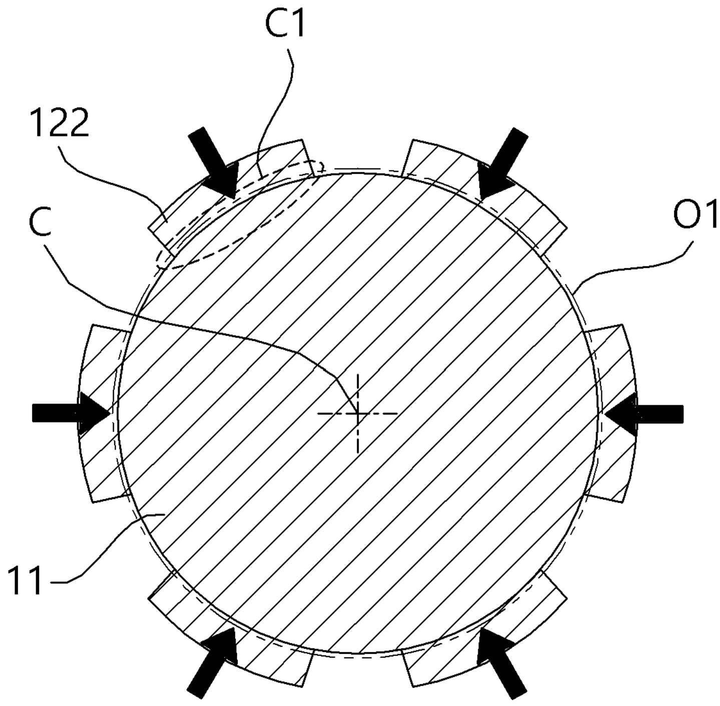
FIG. 9 is a cross-sectional view of the first member on the basis of line C-C shown in FIG. 8.

FIG. 8 is a view illustrating the first member 100 in which the signal pin 11 of the cable 10 is inserted, and FIG. 9 is a cross-sectional view of the first member 100 on the basis of line C-C shown in FIG. 8.

Referring to FIGS. 8 and 9, part of a bent area of the first leg 122 comes into elastic contact with the signal pin 11 so as to form a first contact point C1. Since the plurality of first legs 122 are arranged to be rotationally symmetrical on the basis of a center C of the cable 10, a plurality of such first contact points C1 are arranged at same intervals along a circumferential direction of the signal pin 11. Also, the plurality of first contact points C1 may be arranged on a first circumference O1 formed on the basis of the center C of the cable 10. Also, the plurality of first contact points C1 may be arranged at the same positions in the longitudinal direction (z-axis) of the signal pin 11.

Since the plurality of first legs 122 come into elastic contact with the signal pin 11 in a radial direction as described above, the adaptor 20 is not biased toward the center C of the cable 10 and is coaxially coupled to the cable 10 so as to facilitate impedance matching.

Figure 10:
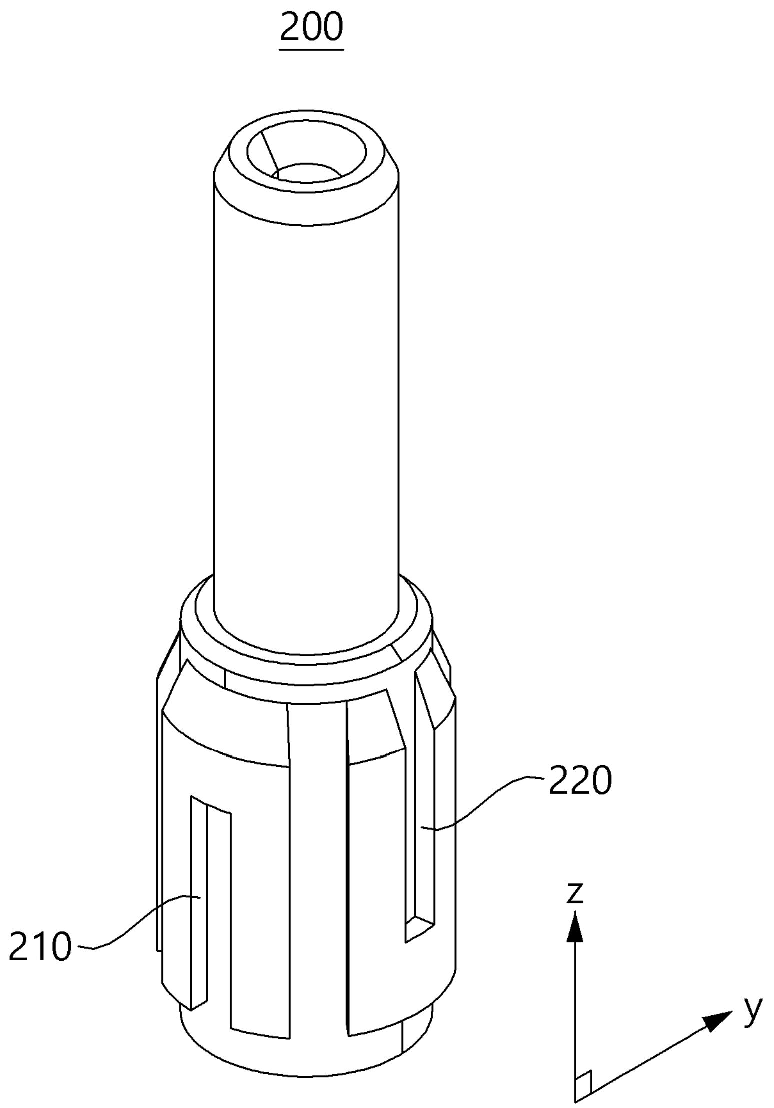
FIG. 10 is a view illustrating a second member.

FIG. 10 is a perspective view illustrating the second member 200.

Referring to FIG. 10, the second member 200 may include a slot portion 210 and 220. The slot portion 210 and 220 is concavely formed in an outer surface of the second member 200. The slot portion 210 and 220 may be disposed along the longitudinal direction (z-axis). The slot portion 210 and 220 may include a first slot 210 and a second slot 220. The first slot 210 may have an inlet which is downwardly formed. On the other hand, the second slot 220 may have an inlet which is upwardly formed. The first slot 210 and the second slot 220 may be alternately arranged along a circumferential direction of the first member 100.

A fifth protrusion 314 (refer to FIG. 11) of the third member 300 is disposed in the first slot 210. A sixth protrusion 315 (refer to FIG. 11) of the third member 300 is disposed in the second slot 220.

Figure 11:
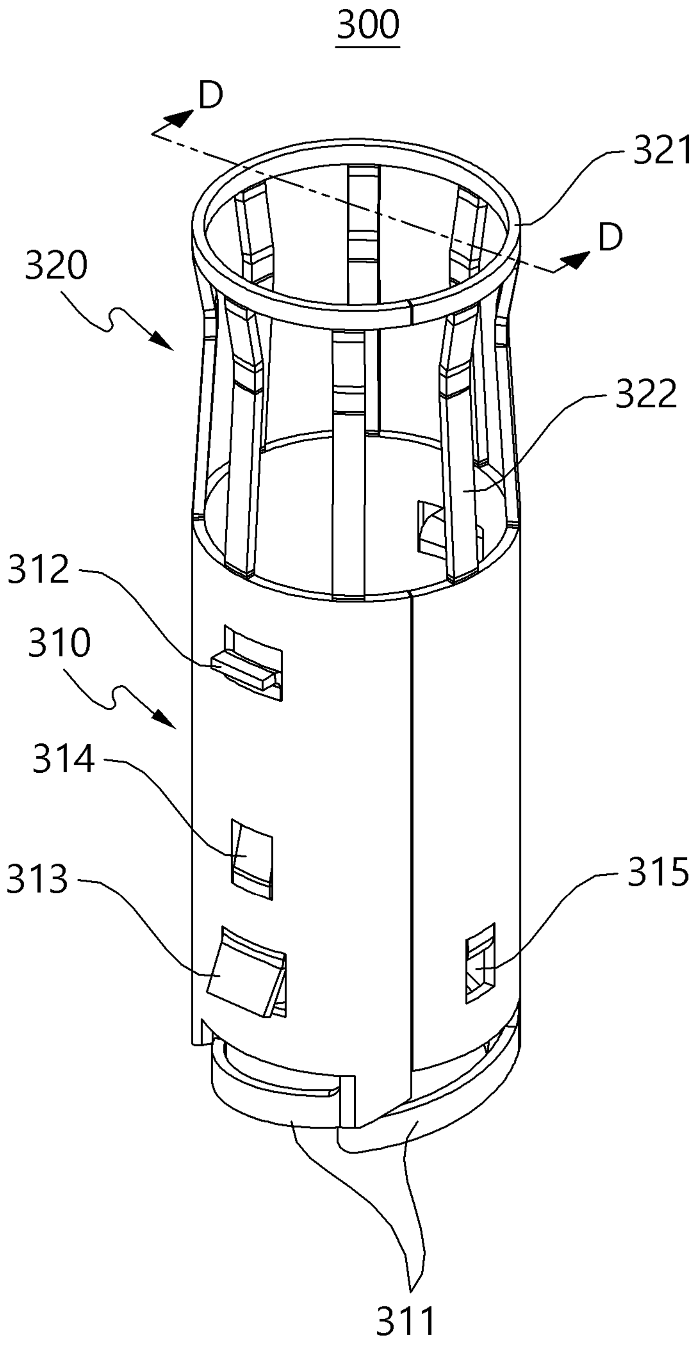
FIG. 11 is a view illustrating a third member.
Figure 12:
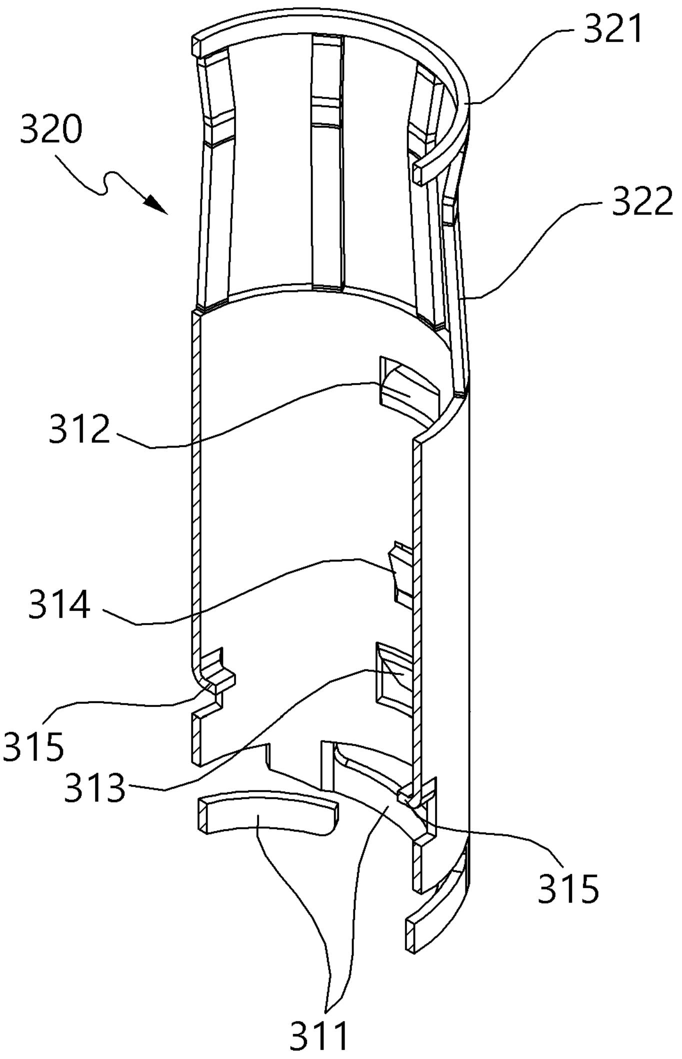
FIG. 12 is a side cross-sectional view of the third member.

FIG. 11 is a view illustrating the third member 300, and FIG. 12 is a side cross-sectional view of the third member 300.

Referring to FIG. 11, the third member 300 may include a second body 310 and a second contact portion 320.

The second body 310 is a cylindrical member and coupled to the second member 200. The second body 310 may include a third protrusion 312 and a fourth protrusion 313. The third protrusion 312 and the fourth protrusion 313 are sections formed by cutting parts of the second body 310 and may be bent and protrude outward. The fourth protrusion 313 may be bent downward toward outside of the second body 310. The third protrusion 312 may be bent upward toward outside of the second body 310.

The third protrusion 312 and the fourth protrusion 313 may come into contact with an inner surface of the hole 1*a* of the base 1 and secure a fixing force of the adaptor 20 and the base 1.

Meanwhile, the second body 310 may include the fifth protrusion 314 and the sixth protrusion 315 as protrusions disposed in the slot portion 210 and 220, respectively. The fifth protrusion 314 and the sixth protrusion 315 are sections formed by cutting parts of the second body 310 and may be bent inward and protrude toward inside of the second body 310. The fifth protrusion 314 may be bent upward toward inside of the second body 310. The sixth protrusion 315 may be bent downward toward inside of the second body 310.

The fifth protrusion 314 may be disposed in the first slot 210 of the second member 200, and the sixth protrusion 315 may be disposed in the second slot 220 of the second member 200. The fifth protrusion 314 and the sixth protrusion 315 may secure a coupling property of the second member 200 and the third member 300, prevent the third member 300 from being separated from the second member 200 in the longitudinal direction (z-axis), and prevent a slip occurring between the second member 200 and the third member 300 in a circumferential direction.

The second body 310 may include a plurality of elastic pieces 311. Each of the elastic pieces 311 extends from a lower surface of the second body 310 and is disposed to be spaced apart from the lower surface of the second body 310. The elastic pieces 311 may be formed to have a spiral shape. The plurality of elastic pieces 311 may be disposed to be spaced apart from each other. A lower end of the elastic piece 311 comes into contact with the object being tested.

When a load is added in the longitudinal direction (z-axis), the elastic piece 311 contracts in the longitudinal direction (z-axis) and provides a restoring force. When coupled to the object being tested, the elastic piece 311 having the spiral shape contracts in the longitudinal direction to have an approximately circular-ring shape to come into coaxial contact with the object being tested so that there is an effect of facilitating impedance matching.

The second contact portion 320 is a part which comes into contact with the outer conductor 12 of the cable 10. The second contact portion 320 is disposed to extend upward from the second body 310. The second contact portion 320 may include a second ring-shaped frame 321 and a plurality of second legs 322. The second ring-shaped frame 321 may be disposed to be spaced apart from the second body 310 in the longitudinal direction z, and the plurality of second legs 322 may extend from the second ring-shaped frame 321 and may be connected to an upper surface of the second body 310. The second legs 322 may be arranged at certain intervals along a circumferential direction of the second ring-shaped frame 321.

The second legs 322 may have a bent shape to be partially located more inward than the second ring-shaped frame 321. For example, the plurality of second legs 322 may have a shape in which an intermediate area is formed to be concave in the longitudinal direction (z-axis). The second legs 322 may include an elastically deformable material. The plurality of second legs 322 may have the same size and shape.

The outer conductor 12 of the cable 10 passes through the second ring-shaped frame 321 and is inserted into the second contact portion 320 along the second legs 322.

Figure 13:
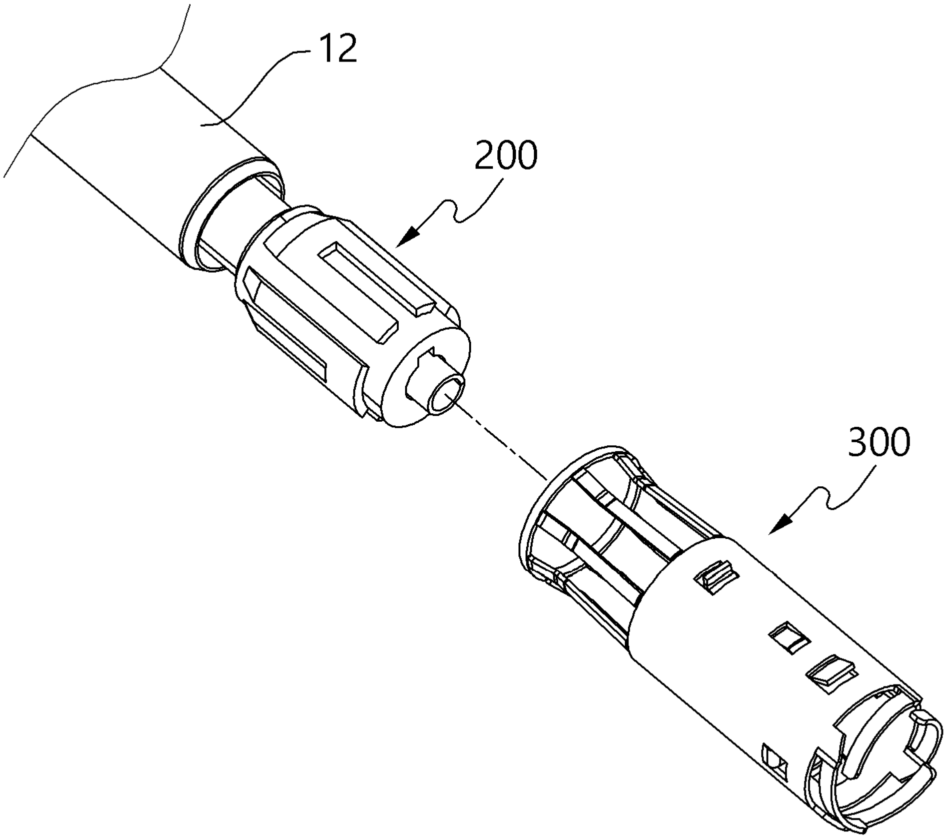
FIG. 13 is a view illustrating the third member which is mounted on the cable.
Figure 14:
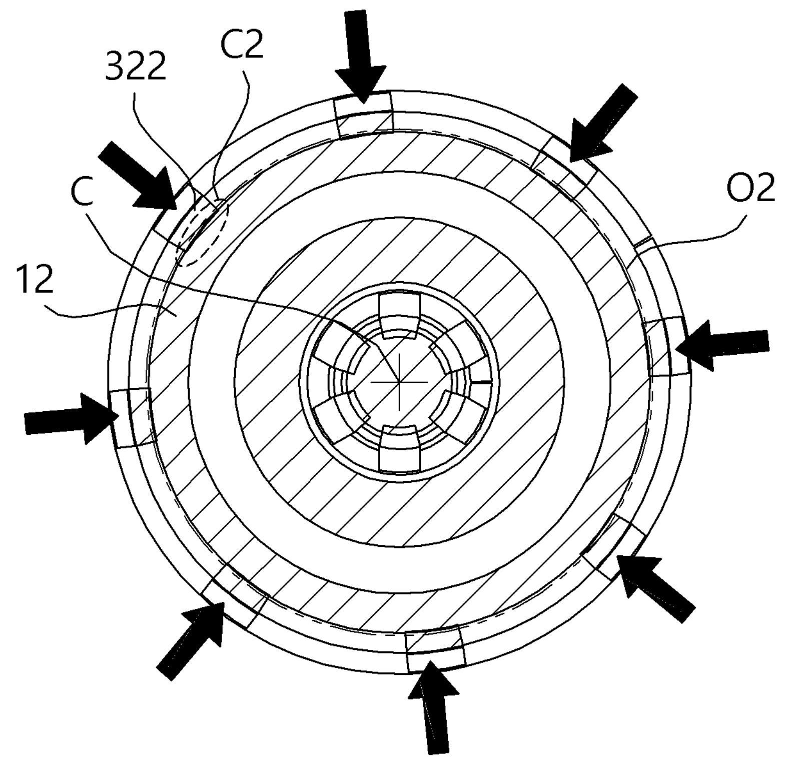
FIG. 14 is a cross-sectional view of the third member on the basis of line B-B shown in FIG. 2.

FIG. 13 is a view illustrating the third member 300 which is mounted on the cable 10, and FIG. 14 is a cross-sectional view of the third member 300 on the basis of line B-B shown in FIG. 2.

Referring to FIGS. 13 and 14, while the second member 200 is mounted on the cable 10, the third member 300 is mounted. When the third member 300 is mounted, the third member 300 may be disposed outside the second member 200 and the outer conductor 12.

Part of a bent area of the second leg 322 comes into elastic contact with the outer conductor 12 so as to form a second contact point C2. Since the plurality of second legs 322 are arranged to be rotationally symmetrical on the basis of the center of the cable 10, a plurality of such second contact points C2 are arranged at same intervals along a circumferential direction of the outer conductor 12. Also, the plurality of second contact points C2 may be arranged on a second circumference O2 formed on the basis of the center C of the cable 10. Also, the plurality of second contact points C2 may be arranged at the same positions in the longitudinal direction (z-axis) of the outer conductor 12.

Since the plurality of second legs 322 come into elastic contact with the outer conductor 12 in a radial direction as described above, the adaptor 20 is not biased toward the center of the cable 10 and is coaxially coupled to the cable 10 so as to facilitate impedance matching.

According to the embodiment of the present invention, since the signal pin 11 is supported in the radial direction by the plurality of first legs 122 and the outer conductor 12 which is connected to the ground is supported by the plurality of second legs 322 in the radial direction, there is an advantage that the adaptor 20 can coaxially connect the ground (outer conductor 12) and the signal pin 11 of the cable 10 at the same time so as to facilitate impedance matching with the object being tested.

Figure 15:
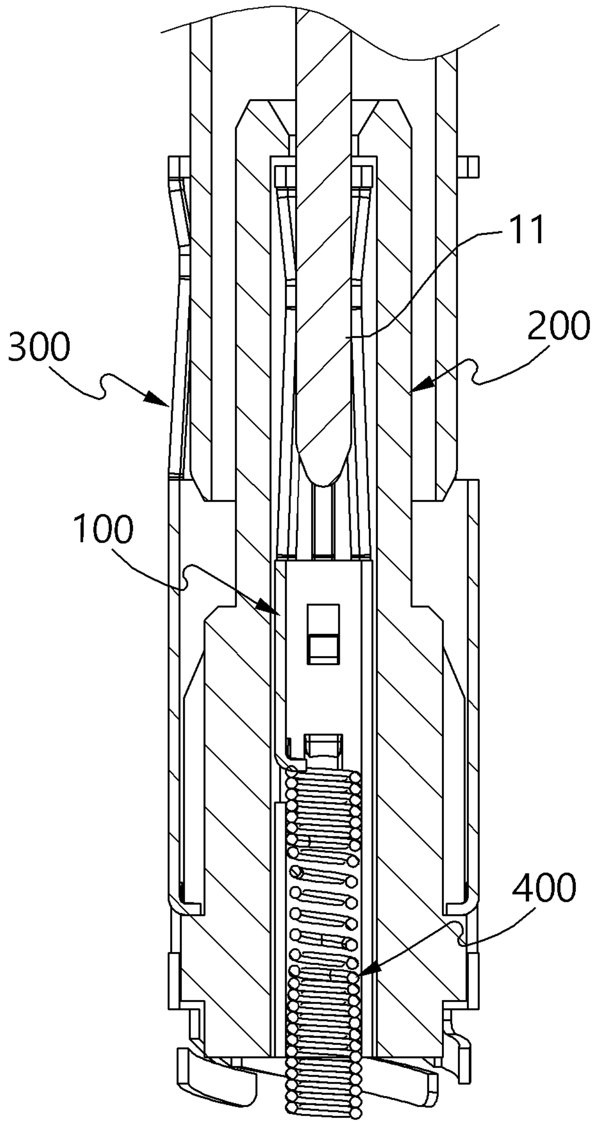
FIG. 15 is a side cross-sectional view of an adaptor including a contact pin according to a modified example.
Figure 16:
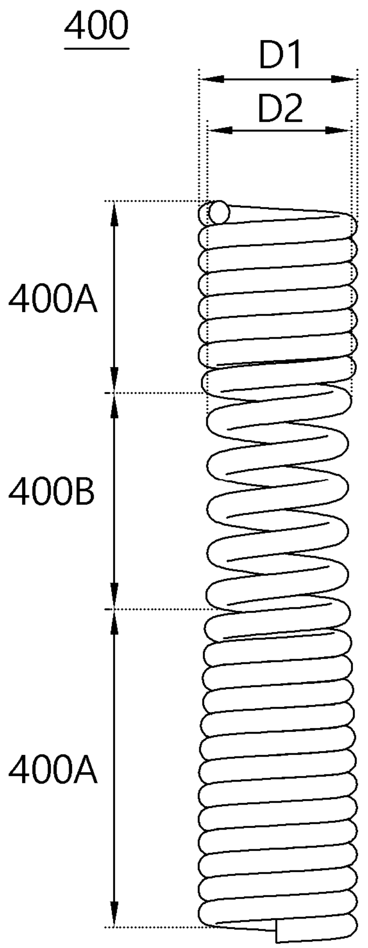
FIG. 16 is a view illustrating the contact pin shown in FIG. 15.

FIG. 15 is a side cross-sectional view of the adaptor 20 including the contact pin 400 according to a modified example, and FIG. 16 is a view illustrating the contact pin 400 shown in FIG. 15.

Referring to FIGS. 15 and 16, the contact pin 400 according to the modified example may be a coil spring having a restoring force at the time of contracting. The contact pin 400 may include a first area 400A and a second area 400B. The second area 400B may have a pitch greater than a pitch of the first area 400A. Also, an outer diameter D2 of the second area 400B may be smaller than an outer diameter D1 of the first area 400A.

The contact pin 400 secures a coupling force with the first member 100 and an elastic force in consideration of impedance matching with the object being tested.

The cable adaptor 20 according to one exemplary embodiment of the present invention has been described above in detail with reference to the attached drawings.

According to embodiments, an adaptor is configured to come into contact with and support a signal pin of a cable in a radial direction and to come into contact with and support an outer conductor of the cable in a radial direction so as to easily implement the cable and the adaptor which are coaxial.

According to embodiments, since the signal pin is guided along first legs while inserted into a first contact portion so as to form a plurality of first contact points formed along a circumferential direction, there is an advantage of easily implementing the cable and the adaptor which are coaxial.

According to embodiments, since a third member is guided along second legs while inserted into a second contact portion so as to form a plurality of second contact points formed along a circumferential direction, there is an advantage of easily implementing the cable and the adaptor which are coaxial.

According to embodiments, since the adaptor remains in coaxial contact with not only the signal pin but also the outer conductor of the cable, there is an advantage of easy impedance matching with an object being tested.

The above-described embodiment of the present invention should be understood as being exemplary and not limitative in every aspect, and the scope of the present invention will be defined by the following claims rather than the above detailed description. Also, not only the meaning and scope of the claims but also all changeable or modifiable forms derived from the equivalent concept thereof should be construed as being included in the scope of the present invention.

What is claimed is:

1. A cable adaptor which is connected to a cable including an outer conductor, comprising:

a first member which is conductive and comes into contact with a signal pin of the cable;

a second member disposed outside the first member and coupled to the first member;

a third member which is conductive and disposed outside the second member; and a contact pin fixed to the first member, wherein the first member comprises a first body coupled to the second member and a first contact portion which extends from the first body and comes into contact with the signal pin, wherein the third member comprises a second body coupled to the second member and a second contact portion which extends from the second body and comes into contact with the outer conductor, wherein a plurality of first contact points of the signal pin and the first contact portion are arranged at same intervals along a circumferential direction of the signal pin, and wherein a plurality of second contact points of the outer conductor and the second contact portion are arranged at same intervals along a circumferential direction of the outer conductor.

2. The adaptor of claim 1, wherein the plurality of first contact points are arranged at same positions in a longitudinal direction of the signal pin, and wherein the plurality of second contact points are arranged at same positions in a longitudinal direction of the outer conductor.

3. The adaptor of claim 1, wherein the first contact portion comprises a first ring-shaped frame and a plurality of first legs which extend from the first ring-shaped frame and are connected to the first body, wherein the plurality of first legs are bent and come into elastic contact with the signal pin at the first contact points, wherein the second contact portion comprises a second ring-shaped frame and a plurality of second legs which extend from the second ring-shaped frame and are connected to the second body, and wherein the plurality of second legs are bent and come into elastic contact with the outer conductor at the second contact points.

4. The adaptor of claim 1, wherein the second body comprises a plurality of spiral elastic pieces which extend from a lower surface of the second body and are disposed to be spaced apart from the lower surface of the second body.

5. The adaptor of claim 1, wherein the second member comprises a slot portion concavely formed in an outer surface of the second member along a longitudinal direction of the second member, and wherein the third member comprises a protrusion which protrudes from an inner surface of the third member and is disposed in the slot portion.

6. The adaptor of claim 5, wherein the slot portion comprises a first slot and a second slot, wherein the first slot and the second slot are alternately arranged along a circumferential direction of the second member, and wherein an inlet of the first slot is opposite to an inlet of the second slot on the basis of a longitudinal direction.

7. A cable adaptor which is connected to a cable including an outer conductor, comprising:

a first member which is conductive and comes into contact with a signal pin of the cable;

a second member disposed outside the first member and coupled to the first member;

a third member which is conductive and disposed outside the second member; and a contact pin fixed to the first member, wherein the first member comes into contact with the signal pin and forms a plurality of first contact points, wherein the third member comes into contact with the outer conductor and forms a plurality of second contact points, wherein the plurality of first contact points are arranged on a first circumference on the basis of a center of the cable, and wherein the plurality of second contact points are arranged on a second circumference on the basis of the center of the cable.

8. The adaptor according to claim 1, wherein the contact pin is a pogo pin having a restoring force at the time of contracting.

9. The adaptor according to claim 7, wherein the contact pin is a pogo pin having a restoring force at the time of contracting.

10. The adaptor according to claim 1, wherein the contact pin is a coil spring having a restoring force at the time of contracting.

11. The adaptor according to claim 7, wherein the contact pin is a coil spring having a restoring force at the time of contracting.

12. The adaptor of claim 10, wherein the contact pin comprises a first area and a second area having a pitch greater than a pitch of the first area, and wherein an outer diameter of the second area is smaller than an outer diameter of the first area.

13. The adaptor of claim 11, wherein the contact pin comprises a first area and a second area having a pitch greater than a pitch of the first area, and wherein an outer diameter of the second area is smaller than an outer diameter of the first area.

* * * * *